United States Patent
Wang

[19]

[11] Patent Number: 6,162,145
[45] Date of Patent: Dec. 19, 2000

[54] TRACTION DRIVE TYPE DRIVING APPARATUS

[75] Inventor: Hong You Wang, Tsu, Japan

[73] Assignee: Teijin Seiki Co., Ltd., Japan

[21] Appl. No.: 09/421,296

[22] Filed: Oct. 20, 1999

[30] Foreign Application Priority Data

Dec. 22, 1998 [JP] Japan .................................. 10-364313
Sep. 6, 1999 [JP] Japan .................................. 11-251680

[51] Int. Cl.$^7$ .................................................. F16H 13/08
[52] U.S. Cl. ............................................. 476/70; 476/67
[58] Field of Search .............................. 475/183; 476/70, 476/67

[56] References Cited

U.S. PATENT DOCUMENTS 4,095,488 6/1978 Nilsson .
4,709,589 12/1987 Kraus ........................................ 476/67

FOREIGN PATENT DOCUMENTS

5125538 7/1976 Japan .
6246742 10/1987 Japan .

*Primary Examiner*—Dirk Wright
*Attorney, Agent, or Firm*—Rothwell, Figg, Ernst & Manbeck, P.C.

[57] ABSTRACT

A traction drive type driving apparatus is provided, by which any particular pressing mechanism is unnecessary, by which a big deformation can be obtained easily, in which decreasing degree of the pressing load is extremely small against small amount of abrasion, in which the test for confirming the pressing load at a desired amount can be done easily, and which has a readily constructible hollow structure. The traction drive type driving apparatus comprises an externally contacting shaft (2) located at the center, a plurality of intermediate shafts (1) equidistantly disposed around and externally contacting with the externally contacting shaft (2), and an internally contacting cylinder (3) internally contacting with the intermediate shafts (1), at least one of the intermediate shafts offset from the center is an input shaft, and the externally contacting shaft (2) is a ring-like hollow cylinder and is held by the intermediate shafts (1) to form a floating ring without disposing any particular bearing.

12 Claims, 4 Drawing Sheets

TRACTION DRIVE TYPE DRIVING APPARATUS

BACKGROUND OF THE INVENTION

1. Field of the Invention

The present invention relates to a driving apparatus of a so-called traction type or friction drive type, wherein torque transmission is realized with low noise and low vibration by utilizing shearing resistance of oil membrane or frictional resistance (when lubricant is not used) between cylindrical surfaces pressed to each other. The present invention relates to improvement of a driving apparatus of such a type.

2. Description of Related Art

Traction drive type driving apparatus has been known as a low noise driving apparatus. Conventionally, as a transmitting apparatus of such a type, for example, Japanese Patent Publication No. Sho 62-46742 discloses a driving force transmitting apparatus of a planetary roller type provided with an elastic roller. The transmitting apparatus disclosed in the Japanese Patent Publication No. Sho 62-46742, forces are exerted to the elastic roller having U-shaped cross section from both the sides so that the inner diameter of the roller is decreased so as to obtain pressing force.

Japanese Patent Publication No. Sho 51-25538 discloses a reduction device using frictional transmission wherein an input spindle and output spindle are opposed on a same axis, a plurality of rollers are disposed between an inner race integrally formed with the input spindle and a fixed elastically deformable outer race, a shaft with a holding ring for rotatably supporting the rollers is connected to the output spindle, an annular hydraulic chamber is formed between the outer race and a housing of the reduction device, and when frictional transmission is effected from the input spindle to the output spindle via the rollers, hydraulic pressure corresponding to the load of the output spindle is supplied to the hydraulic chamber so as to decrease the outer race in a radial direction, and radial pressure is applied to the rollers.

Problems to Be Solved by the Invention

In the transmitting apparatus disclosed in Japanese Patent Publication No. Sho 62-46742, the elastic roller with U-shaped cross section is complicated in its shape, and it is complicated also in its construction since it requires a mechanism for deforming both the sides. Accordingly, it leads to high cost. Further, test for confirming the pressing load at a desired amount is very difficult.

Further, in the elastic roller disposed in the reduction device in the apparatus disclosed in Japanese Patent Publication No. Sho 62-46742, the U-shaped cross section is relatively small, and occurrence of a large stress is inevitable when it is deformed big. In addition to this, the decreasing amount of the inner diameter of the elastic roller cannot be increased when strength against fatigue of the material is took into consideration. Accordingly, it is difficult to obtain a large pressing force, and even when only a little bit initial abrasion occurs, the pressing load is sharply decreased, and accordingly, the transmitting capability is widely decreased and reliability is lowered.

Contrary to this, in the reduction device disclosed in the Japanese Patent Publication No. Sho 51-25538, the hydraulic chamber is formed by the inner roller and the casing by constructing the inner roller, i.e., the outer race in such a manner that inner surface of the thick cylindrical portion is connected to both the ends of the relatively thin cylindrical portion. When the thin cylindrical portion of the inner roller is deformed toward the center by applying working oil into the hydraulic cylinder, pressing force is exerted between the inner roller and the planetary roller.

However, in the reduction device disclosed in the Japanese Patent Publication No. Sho 51-25538, since the inner roller is hydraulically deformed, conduits for introducing hydraulic power and sealing means are required, and accordingly, the device becomes complicated, and inconvenience in decrease of hydraulic pressure due to, for example, leakage of oil may occur easily.

BRIEF SUMMARY OF THE INVENTION

Objects of the Invention

It is an object of the present invention to obviate the problems inherent to the above-described prior art.

It is another object of the present invention to provide a traction drive type driving apparatus, by which any particular pressing mechanism is unnecessary.

It is a still other object of the present invention to provide a traction drive type driving apparatus, by which a big deformation can be obtained easily.

It is a further object of the present invention to provide a traction drive type driving apparatus, in which decreasing degree of the pressing load is extremely small against small amount of abrasion.

It is a still further object of the present invention to provide a traction drive type driving apparatus, in which the test for confirming the pressing load at a desired amount can be done easily.

It is a further object of the present invention to provide a traction drive type driving apparatus, which has a readily constructible hollow structure.

Means to Solve the Problems

According to the first aspect of the present invention, the objects are achieved by a traction drive type driving apparatus comprising an externally contacting shaft located at the center, a plurality of intermediate shafts equidistantly disposed around and externally contacting with the externally contacting shaft, and an internally contacting cylinder internally contacting with the intermediate shafts, at least one of the intermediate shafts offset from the center being an input shaft, and the externally contacting shaft being a ring-like hollow cylinder.

In this occasion, it is preferred that the externally contacting shaft forming the ring-like hollow cylinder is supported by the intermediate shafts without disposing any particular supporting bearing to form a floating ring, and the hollow externally contacting shaft has an outer diameter under free condition being a little bit larger than the diameter of an imaginary circle which externally contacts with the plurality of intermediate shafts whereby pressing load is created by deformation of the hollow cylinder.

In the traction drive type driving apparatus according to the present invention, the internally contacting cylinder may comprise coaxially arranged double hollow rings, and the inner ring and the outer ring of the double hollow rings may be connected to each other by means of connecting means.

In this case, it is preferred that the inner ring of the internally contacting cylinder of the ring-like hollow cylinder is supported by the intermediate shafts without disposing any particular supporting bearing to form a floating ring, whereby deformation of the inner ring caused by deformation of the externally contacting shaft formed in the ring-like hollow cylinder is prevented from being transmitted to the outer ring.

In the present invention of this type, the internally contacting cylinder may be an output shaft, or it may further comprise a supporting member for rotatably supporting the plurality of intermediate shafts and the internally contacting cylinder, and the supporting member may be an output shaft.

Further, according to another aspect of the present invention, the objects are achieved by a traction drive type driving apparatus comprising an externally contacting shaft located at the center, a plurality of intermediate shafts equidistantly disposed around and externally contacting with the externally contacting shaft, and an internally contacting cylinder internally contacting with the intermediate shafts, the externally contacting shaft or at least one of the intermediate shafts being an input shaft, the internally contacting cylinder being of deformable hollow ring-like and integrally engaging with a holding member of the internally contacting cylinder by means of a holding means.

In this occasion, it is preferred that, the internally contacting cylinder of a ring-like hollow cylinder is supported by the intermediate shafts without disposing any particular supporting bearing to form a floating ring, and the hollow internally contacting cylinder has an inner diameter under free condition being a little bit smaller than the diameter of an imaginary circle which externally contacts with the plurality of intermediate shafts whereby pressing load is created by deformation of the internally contacting cylinder.

In the present invention of this type, the holding member of the internally contacting cylinder may be an output shaft, or it may further comprise a supporting member for rotatably supporting the plurality of intermediate shafts and the holding member of the internally contacting cylinder, and the supporting member may be an output shaft.

According to the present invention, the internally contacting cylinder or the externally contacting shaft may be of a hollow ring-like cylinder, and it is so constructed that it is floated so as to be freely deformable in a elastic region, i.e., it is supported by the intermediate shafts without disposing any bearing. The size and material of the externally contacting shaft or the internally contacting cylinder formed by a hollow ring-like cylinder is suitably selected so that the contacting force of a desired amount can be created while it externally or internally contacts with the intermediate shafts and that fatigue does not cause by repeated stress.

For example, when the externally contacting shaft is selected as a floating ring, this floating ring, i.e., the hollow externally contacting shaft, is so shaped that its outer diameter under free condition is a little bit larger than the diameter of an imaginary circle which externally contacts with the intermediate shafts. The floating ring is assembled at the center so that it externally contacts with a plurality of intermediate shafts. Thus, the peripheral shape of the floating ring, i.e., the hollow externally contacting shaft, the cross section of which has been a real circle, is deformed in a wave-like shape within the elastic region, and the contacting force is created. In this occasion, the number of the waves formed by the deformation of the floating ring is equal to that of the intermediate shafts.

Contrary to this, when the internally contacting cylinder is selected as a floating ring, this floating ring, i.e., the hollow ring-like internally contacting cylinder, is so shaped that its inner diameter under free condition is a little bit smaller than the diameter of an imaginary circle which internally contacts with a plurality of intermediate shafts. The floating ring is so assembled as to surround the intermediate shafts so that it internally contacts with a plurality of intermediate shafts. Further, in order to facilitate the capability of the floating ring, the internally contacting cylinder has a plurality of dents formed at the outer surface thereof, and it integrally engages with the holding member of the internally contacting cylinder by means of pin members disposed in the dents. Thus, the internal shape of the floating ring, i.e., the hollow ring-like internally contacting cylinder, the cross section of which has been a real circle, is deformed in a wave-like shape in the elastic region, and the contacting force is created. In this occasion, the number of the waves formed by the deformation of the floating ring is equal to that of the intermediate shafts.

The supporting method according to the present invention does not include any supporting bearing, and accordingly, the internally contacting cylinder or the externally contacting shaft which is formed by a ring-like hollow cylinder is permitted to set a large amount of deformation. Accordingly, the contacting load and the amount of deformation in the ring can be easily altered by selecting the thickness and the diameter of the ring.

According to the present invention, a floating ring is used as the internally contacting cylinder or the externally contacting ring and it is so assembled that it presses the intermediate shafts. Accordingly, the floating ring deforms from the real circle condition into a wave condition, the number of the waves is the same as that of the intermediate shafts, and it creates pressing force. Thus, the contacting load and the amount of deformation in the ring can be easily altered by selecting the thickness and the diameter of the ring.

Further, there may be a fear in decrease of rotational preciseness of the internally contacting cylinder caused by its vibration as a result of action of the pressing force upon the intermediate shafts and the internally contacting cylinder due to deformation of the externally contacting shafts. In order to to obviate such a fear, according to the present invention, the internally contacting cylinder may comprise co-axially arranged double hollow cylindrical rings, and the inner ring and the outer ring of the double hollow cylindrical rings may be connected to each other by means of connecting means. As a result of this construction, deformation of the inner ring caused by deformation of the externally contacting shafts, which ring is formed in a hollow ring-like cylinder, is prevented from being transmitted to the outer ring. Accordingly, the rotational preciseness of the internally contacting cylinder increases. In addition, the machining amount of the internally contacting cylinder may be reduced due to the construction of the double hollow rings, and advantages in easy manufacturing may be also achieved.

According to the present invention, the construction is very simple, and it requires no particular pressing mechanism other than the floating ring, and a big pressing load and pressing deformation can be obtained easily. Further, since the shape of the floating ring, i.e., internally contacting cylinder or the externally contacting shafts, is also simple, its manufacture is easy. In addition, since the amount of the pressing load can be determined by measuring the maximum deformation of the floating ring in a radial direction relative to the real circle, the pressing load is easily prevented from becoming excessively large or excessively small. The maximum deformation can be known by measuring the deviation of the diameter, i.e., the internal diameter of the internally contacting cylinder or the outer diameter of the externally contacting shaft, by means of, for example, a dial gauge.

BRIEF DESCRIPTION OF THE SEVERAL VIEWS OF THE DRAWINGS

The present invention will now be explained in detail with reference to the accompanying drawings, wherein.

Preferred Embodiments

Figure 1A:
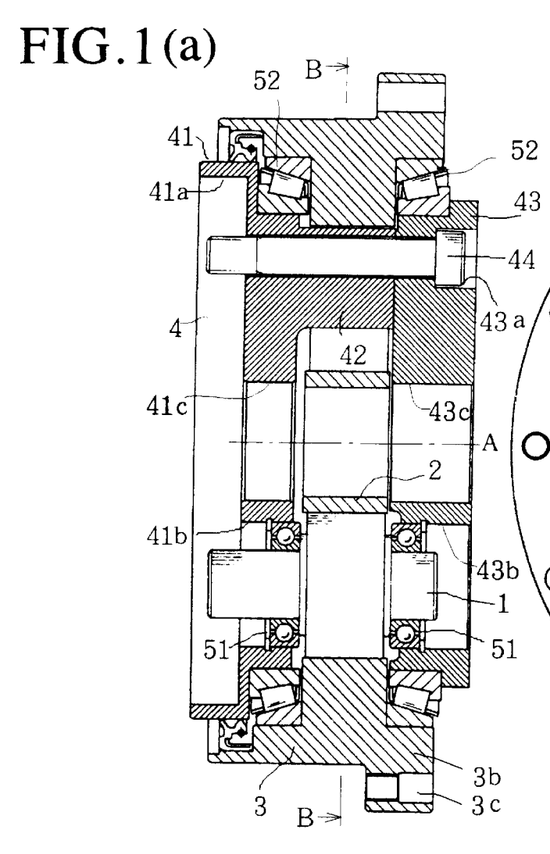
FIG. 1 shows the first embodiment of the present invention, wherein (a) is a cross sectional view, and (b) is a cross sectional view taken along line B—B in (a)

Referring to FIG. 1(a), reference numeral 4 denotes a supporting member. The supporting member 4 comprises an circular disc portion 41, a plurality of (3 in this embodiment illustrated in FIG. 1) column portions 42 projecting from the circular disc portion 41, and an end plate 43 integrally attached to the ends of the column portions 42 by means of bolts 44. A plurality of the projecting column portions 42 are equidistantly disposed about the center A as illustrated in FIG. 1(b).

The circular disc portion 41 has a motor mounting surface formed as illustrated in FIG. 1(a) or cavity 41a for accommodating pulleys and so on (not illustrated) for the purpose of multiple staged reduction at the left thereof and a plurality of (3 in the embodiment illustrated in FIG. 1) bearing disposing holes 41b formed therein. A plurality of bearing disposing holes 41b are, as illustrated in FIG. 1(b), located between the adjacent column portions 42, respectively, in such a manner that they are equidistantly arranged about the center A. A bearing 51 is disposed in each bearing disposing hole 41b.

Figure 1B:
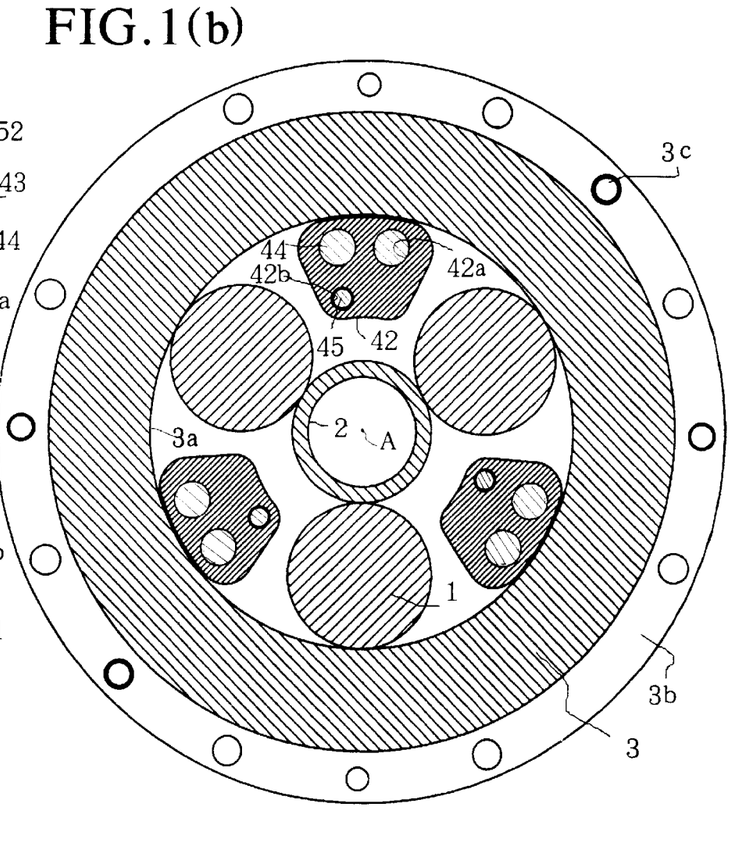

As illustrated in FIG. 1(b), the column portions 42 have pin inserting holes 42b for securing the positioning pins 45 and bolt holes 42a for passing therethrough at the ends hereof. Accordingly, as illustrated in FIG. 1(a), the bolts 44 inserted from the right of the end plate 43 pass through the column portions 42 and the circular disc portion 41 and are screwed up to another member (not illustrated) such as the fixed member or output taking out member. Thus, the end plate 43 is integrally secured to the column portions 42 to form a rigid supporting member 4. In this embodiment, the rigid supporting member 4 is at the same time secured to another member.

The end plate 43 and the circular disc portion 41 of the supporting member 4 have central holes 43c and 41c, respectively, for passing electric wires or hydraulic conduits therethrough, formed therein so as to facilitate easy assembling of the hollow structure.

The end plate 43 has bearing disposing holes 43b formed therein at positions corresponding to a plurality of bearing holes 41b formed in the circular disc portion 41, and bearing 51 is disposed in each bearing holes 43b like the above-described bearing disposing holes 41b.

As described above, the bearings 51 are disposed in the bearing disposing holes 41b of the circular disc portion 41 and the bearing disposing holes 43b of the end plate 43, and intermediate shafts 1 are rotatably supported between the opposing bearings 51 and 51. In the illustrated embodiment, the number of the intermediate shafts 1 is three (3), however, the number of the intermediate shafts may be equal to or more than three (3). The intermediate shafts 1 are equidistantly disposed about the center A.

An externally contacting shaft 2 made of a thin ring-like hollow circular cylinder is disposed at the center A in such a manner that it externally contacts with three intermediate shafts 1. The externally contacting shaft 2 of a ring-like hollow circular cylinder is so formed that its outer diameter under free condition being a little bit larger than the diameter of an imaginary circle which externally contacts with the plurality of intermediate shafts. Since the externally contacting shaft 2 externally contacts the three intermediate shafts 1, the externally contacting shaft 2 of a ring-like hollow circular cylinder is supported by the intermediate shafts 1 without any supporting bearing as a floating ring, and it presses the intermediate shafts 1 by a predetermined force due to the contacting pressure upon contact with the intermediate shafts 1. The size and the material of the externally contacting shaft 2 of a ring-like hollow circular cylinder are so selected that a desired pressing force can be created by externally contacting with the intermediate shafts and that fatigue does not occur due to repeated stress.

The above-described circular disc portion 41 and the end plate 43 of the supporting member 4 have bearings 52 mounted at the outer surfaces thereof, and the internally contacting cylinder 3 is supported rotatable relative to the supporting member by means of the bearings 51. The inner surface 3a of the internally contacting cylinder 3 internally contacts with the intermediate shafts 1. As described above, the intermediate shafts 1 are pressed by the ring-like externally contacting shaft 2, and the pressed intermediate shafts 1 are in turn pressed to the internally contacting cylinder 3 by a predetermined pressure. As illustrated in FIG. 1(b), the inner surface 3a of the internally contacting cylinder 3 does not contact with the outer surface of the column portion 42 forming a small clearance therebetween.

The internally contacting cylinder 3 has a flange 3b formed at the periphery thereof, and the flange 3b has connecting holes 3c for connecting a sprocket (not illustrated) or a fixed member (not illustrated) so as to take out the output.

In this embodiment, at least one of the three intermediate shafts 1 which are offset from the center A is connected to an output shaft of a motor or is driven by a motor via a reduction mechanism provided with a spur gears. When driving force is introduced to a plurality of intermediated shafts 1, the inputs should be synchronized. The intermediate shaft 1 or shafts 1 are rotated by the input. As the intermediate shaft 1 rotates, the internally contacting cylinder 3 revolves around the center A at a predetermined reduced speed.

The driving apparatus of the present invention may be a reduction device, wherein the supporting member 4 may be fixed and the rotational output is taken out from the internally contacting cylinder 3, or the internally contacting cylinder 3 may be fixed and the drive force is taken from the supporting member 4. Further, the driving apparatus of the present invention may be a speed increasing device, wherein the input may be introduced from the supporting member 4 or the internally contacting cylinder 3, and the output may be taken up from the intermediate shafts 1.

In the above-described embodiment, the bolts inserted through the end plate 43, the column portion 42 and the circular disc portion 41 of the supporting member 4 were screwed up to another member (not Illustrated) so that the end plate 43 of the supporting member 4 was fixed to the column portion 42. However, as illustrated in the embodiment which will be described later, the bolts 44 may not pass through the column portion 42 but may be fastened to the screw threads formed in the column portions 42 so as to fix the end plate 43 to the column portions 42.

The second embodiment of the present invention will now be explained with reference to FIG. 2. In this second embodiment, like the above-described embodiment, a supporting member 4 comprises an circular disc portion 41, three column portions 42 projecting from the circular disc portion 41, and an end plate 43 integrally attached to the ends of the column portions 42 by means of bolts 44.

The circular disc portion 41 has bearing disposing holes 41b formed therein in which bearings 51 are disposed, and the end plate 43 has bearing disposing holes 43b formed therein in which bearings 51 are similarly disposed. Intermediate shafts 1 are rotatably supported by the bearings 51. Although the externally contacting shaft 2 which contacts with the intermediate shafts 1 is a hollow cylinder in the first embodiment, the externally contacting shaft 21 which contacts with the intermediate shafts 1 is solid. An internally contacting cylinder 31 internally contacts with the outer surface of the intermediate shafts 1. However, as illustrated in FIG. 2(b), the inner surface of the internally contacting cylinder 31 does not contact with the outer surface of the column portions 42 forming a small clearance therebetween.

The internally contacting cylinder 31 is so shaped that its inner diameter under free condition is a little bit smaller than the diameter of an imaginary circle which internally contacts with a plurality of intermediate shafts 1. The size and the material of the internally contacting cylinder 1 are so selected that a desired pressing force can be created by internally contacting with the intermediate shafts 1 and that fatigue does not occur due to repeated stress.

The circular disc portion 41 and the end plate 43 have bearings 52 mounted at the outer surfaces thereof, and a holding member 5 is rotatably supported by the bearings 52, the holding member 5 being located outside the internally contacting cylinder 31.

The internally contacting cylinder 31 has a plurality of (eight in this embodiment) semi-circular dents 31a equidistantly formed at the outer surface thereof. The holding member 5 has semi-circular dents 5a formed at the inner surface thereof corresponding to the semi-circular dents 31a formed at the outer surface of internally contacting cylinder 31. Cylindrical pin members 32 are disposed between the semi-circular dents 31a of the internally contacting cylinder 31 and the semi-circular dents 5a of the holding member 5, and thus, the internally contacting cylinder 31 and the holding member 5 are integrated to each other with respect to the rotation in a circular direction by means of the pin members 32, which is the holding means of the present invention, and at the same time deformation of the internally contacting cylinder in a radial direction is permitted due to the ring-like clearance therebetween.

In this embodiment, the left end of the externally contacting shaft 21 located at the center A projects to the left to form a connecting portion to which an input motor (not illustrated) may be connected. Driving force is introduced from the motor connecting portion.

As the externally contacting shaft 21 rotates, the intermediate shafts which are contacting with the externally contacting shaft 1 rotate, and further, since the intermediate shafts 1 are contacting with the ring-like internally contacting cylinder 31, the input rotation is reduced and is taken up. In this occasion, if the supporting member is fixed, output is taken out from the holding member 5 as the internally contacting cylinder 31 rotates. Contrary to this, when the holding member 5 is fixed, the supporting member rotates, and driving force, the speed of which is reduced, can be taken out from the supporting member 4. It is also possible that the input is introduced from the intermediate shafts 1 and that the output is taken out from the internally contacting cylinder 31. Further, the driving device may be a speed increasing device, wherein the output may be introduced from the supporting member 4 or the internally contacting cylinder 31, and the output may be taken out from the intermediate shafts 1 or the externally contacting shaft 21.

Similar to the internally contacting cylinder 3 in the above-described embodiment, the holding member 5 has holes 5c for connecting a sprocket which is used to take out the rotational driving force or a fixed member and bolt holes.

A still other embodiment of the present invention will now be explained with reference to FIG. 3.

Figure 2A:
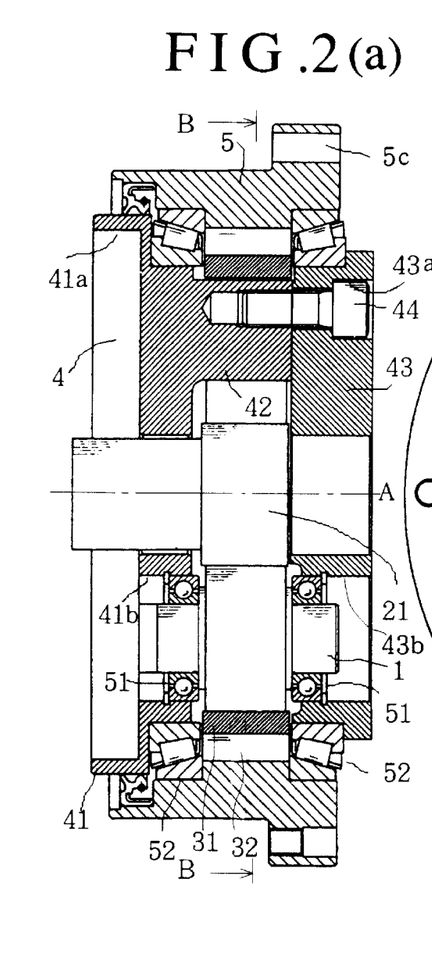
FIG. 2 shows the second embodiment of the present invention, wherein (a) is a cross sectional view, and (b) is a cross sectional view taken along line B—B in (a)
Figure 2B:
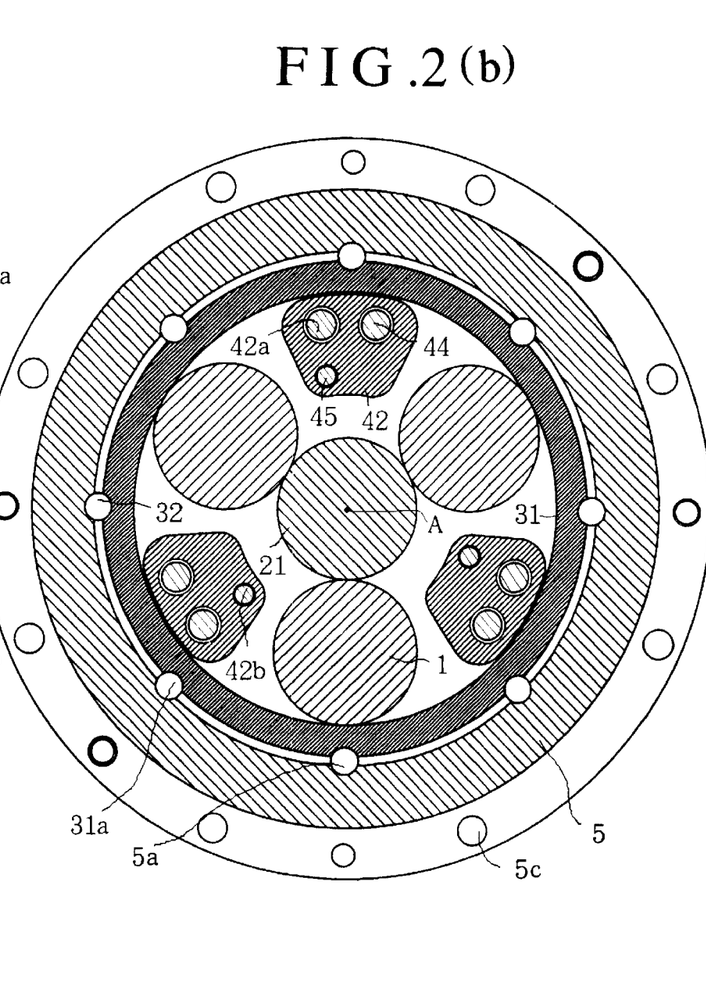
Figure 3:
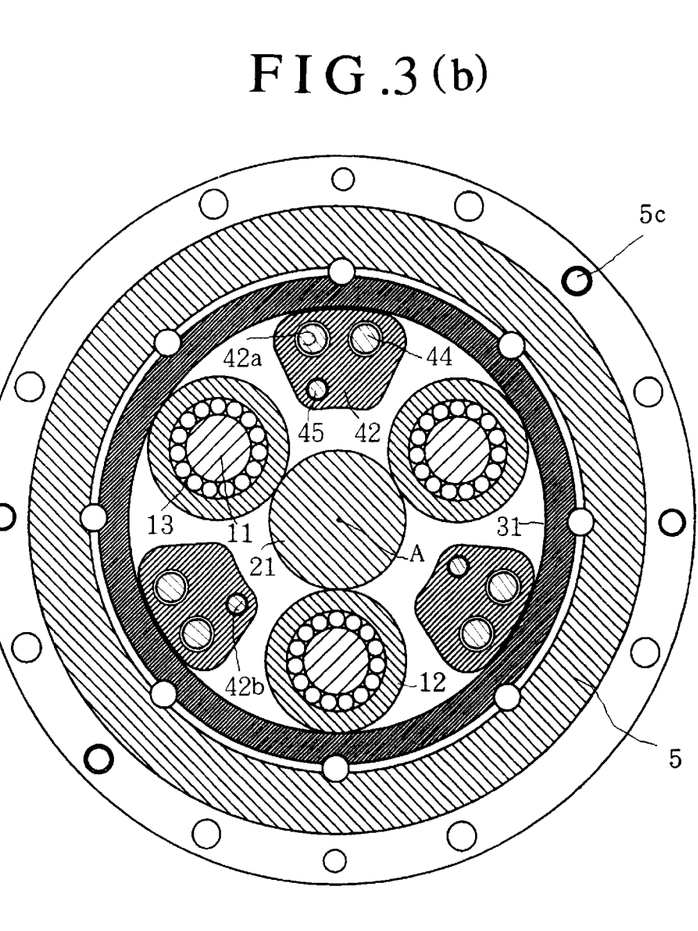
FIG. 3 shows the third embodiment of the present invention, wherein (a) is a cross sectional view, and (b) is a cross sectional view taken along line B—B in (a)

The embodiment illustrated in FIG. 3 is very similar to that illustrated in FIG. 2 and is substantially different from the embodiment illustrated in FIG. 2 in the method for supporting the intermediate shafts 1. More specifically, in the embodiment illustrated in FIG. 2, the intermediate shafts 1 are supported by the bearings 51 disposed in the bearing holding holes 41b and 43c formed in the circular disc portion 41 and the end plate 43, respectively. Contrary to this, in the embodiment illustrated in FIG. 3, the circular disc portion 41 and the end plate 43 have intermediate shaft supporting holes 41c and 43c, respectively formed therein, and cylindrical intermediate shaft supporting members 11 are inserted into and rigidly fixed to the intermediate shaft supporting holes 41c and 43c. The intermediate shaft supporting member 11 has an outer portion 12 of the intermediate shaft formed in an outer race shape of a bearing rotatably supported at the outer surface thereof by means of a bearing 13, which consists of a plurality of rollers in the illustrated embodiment. In short, in this embodiment illustrated in FIG. 3, not the entire intermediate shaft but only the outer portion 12 of the intermediate shaft, i.e., the portion contacting with the externally contacting shaft 21 and the internally contacting cylinder 31, formed in an outer race rotates among the entire intermediate shaft. The remaining construction of this embodiment is similar to that illustrated in FIG. 2.

Figure 4A:
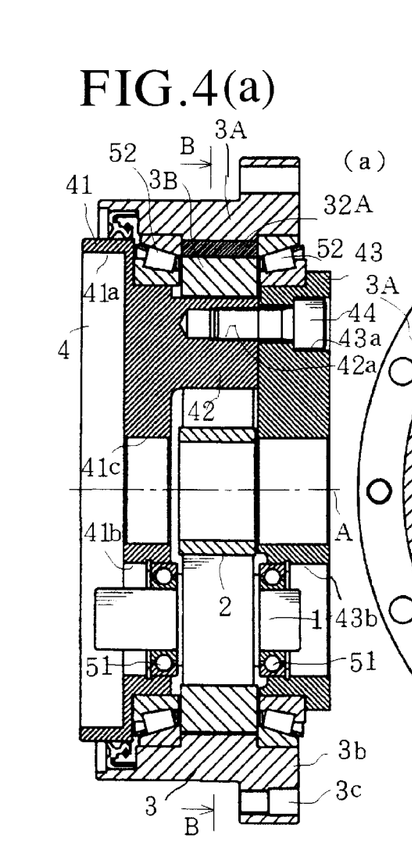
FIG. 4 shows the fourth embodiment of the present invention, wherein (a) is a cross sectional view, (b) is a cross sectional view taken along line B—B in (a), and (c) is an enlarged view of the portion C in (a).
Figures 4B, 4C:
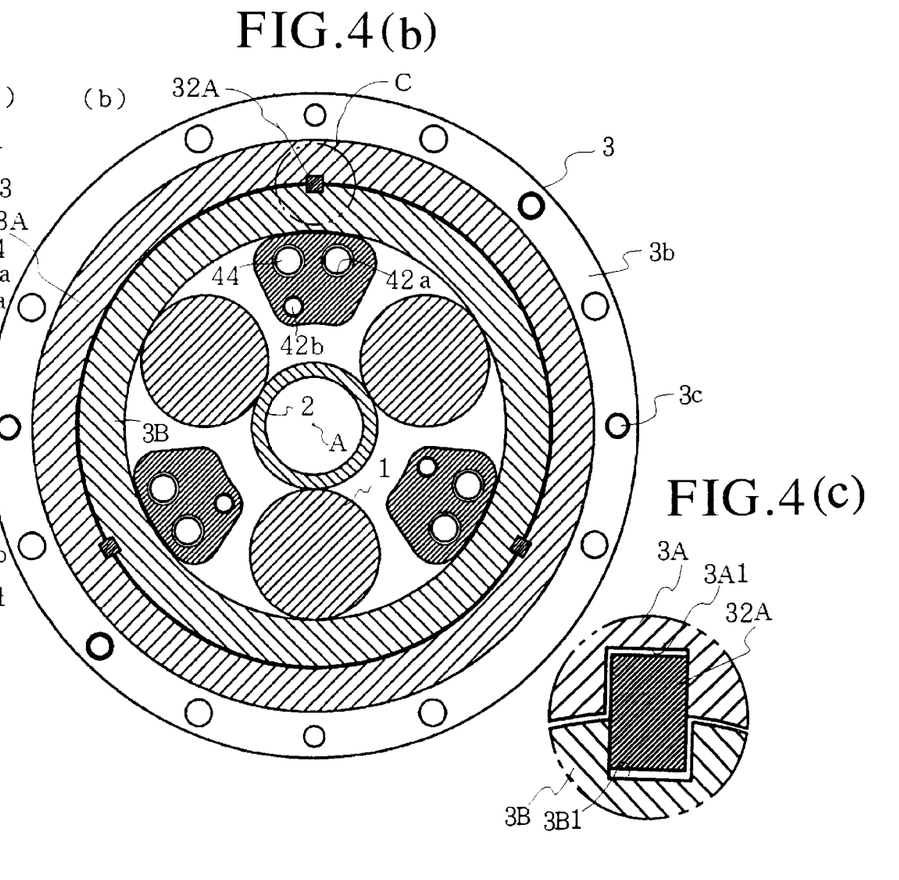

Referring to FIG. 4, wherein (a) is a sectional view, (b) is a view cross sectioned along line B—B in (a), and (c) is an enlarged view of the portion C in (a), a still other embodiment of the present invention will now be explained.

Although the embodiment illustrated in FIG. 4 is very similar to that illustrated in FIG. 1, it largely differs from that illustrated in FIG. 1, in that the internally contacting cylinder 3 comprises the co-axially arranged double hollow rings 3A and 3B in the embodiment illustrated in FIG. 4 while the internally contacting cylinder is integrated in one body in the embodiment illustrated in FIG. 1 Further, although the bolts passing through the end plate 43, the column portions 42 and the circular disc portion 41 of the supporting member 4 are screwed up to another member (not illustrated) so as to secure the end plate 43 of the supporting member 4 to the column portions 42 in the embodiment illustrated in FIG. 1, the bolts 44 are fastened to the screw holes formed in the column portions 42 so as to secure the end plate 43 to the column portions 42 in the embodiment illustrated in FIG. 4 like those illustrated in FIGS. 2 and 3.

In the previous embodiment described referring to FIG. 1, since the internally contacting cylinder is 3 is formed in one body, the pressing force caused by the deformation of the externally contacting shaft 2 located at the innermost center may act upon both the intermediate shafts and the internally contacting cylinder 3 and it may cause vibration of the internally contacting cylinder 3, and thus there may cause a problem in decrease of the rotation preciseness. In order to overcome this problem, in the embodiment illustrated in FIG. 4, the internally contacting cylinder 3 is formed in co-axially arranged double hollow rings 3A and 3B, and a plurality of (three in the illustrated embodiment) key grooves 3A1 and 3B1 having a rectangular cross section as illustrated in FIG. 4(c) are equidistantly formed in a circular direction at the adjacent positions between the outer ring 3A and the inner ring 3B of the double hollow rings 3a and 3B, and connecting members 32a such as keys are fitted between the corresponding key grooves 3A1 and 3B1 so as to connect the outer ring 3A and the inner ring 3B. As a result, the deformation in a radial direction of the inner ring 3B is substantially prevented from being transmitted to the outer ring 3A, and both the rings 3A and 3B are rotated together.

In the embodiment illustrated in FIG. 4(c), the key 32a is in contact with one of the side wall of the key grooves 3A1 and 3B1 and a small clearance is formed between the key 32a and the other sides. However, the key 32a may be close fitted or fixed to one of the key grooves 3A1 or 3B1, alternatively, the key 32A may be integrally formed with the outer ring 3A or the inner ring 3B. Although it is possible to form the connecting member 32A in a pin type roller having a circular cross section, in case of a pin type roller provided with such circular cross section, the pin type roller may rotate between the outer ring 3A and the inner ring 3B, and accordingly, unevenness in rotation of the output of the traction drive apparatus may be caused. Therefore, the key having a rectangular cross section as in the illustrated embodiment is o\preferable.

Further, in this embodiment, the inner ring 3B of the hollow ring-like internally contacting cylinder 3 is supported by the intermediate shafts 1 without providing any special supporting bearings, and it forms a floating ring. This construction is similar to the inner cylinder 31 of the second and third embodiments illustrated in FIGS. 2 and 3.

According to the present embodiment, due to the above-described construction, deformation of the inner ring 3B caused by deformation of the externally contacting shafts 2, which is formed in a hollow ring-like cylinder, is prevented from being transmitted to the outer ring 3A. Accordingly, the rotational preciseness of the inner cylinder 3 increases.

In addition, two kinds of hollow cylinders, i.e., hollow externally contacting shaft 2 and the internally contacting cylinder 3 comprising the hollow inner ring 3B, are used in the present embodiment, pressurizing amount can be increased due to two kind of hollow cylinders relative to the previously described embodiments, and accordingly, decrease of transmitting torque can be more reduced even if the inner surface of the internally contacting cylinder 3 or the outer surface of the externally contacting cylinder is abraded.

Further, since the internally contacting cylinder 3 is formed in the double hollow rings 3A and 3B, the machining amount of the internally contacting cylinder 3 is reduced compared with that for integrally formed hollow cylinder, and accordingly, its manufacture is easy.

According to the present invention, a floating ring is used as the internally contacting cylinder or the externally contacting ring and it is so assembled that it presses the intermediate shafts. Accordingly, the floating ring deforms from the real circle condition into a wave condition, the number of the waves is the same as that of the intermediate shafts, and it creates pressing force. Thus, the contacting load and the amount of deformation in the ring can be easily altered by selecting the thickness and the diameter of the ring.

According to the present invention, the construction is very simple, and it requires no particular pressing mechanism other than the floating ring, and a big pressing load and pressing deformation can be obtained easily.

Further, since the shape of the floating ring, i.e., internally contacting cylinder or the externally contacting shafts, is also simple, its manufacture is easy. In addition, since the amount of the pressing load can be determined by measuring the maximum deformation of the floating ring in a radial direction relative to the real circle, the pressing load is easily prevented from becoming excessively large or excessively small. The maximum deformation can be known by measuring the deviation of the diameter, i.e., the internal diameter of the internally contacting cylinder or the outer diameter of the externally contacting shaft, by means of, for example, a dial gauge.

What is claimed is:

1. A traction drive type driving apparatus comprising an externally contacting shaft located at the center, a plurality of intermediate shafts equidistantly disposed around and externally contacting with the externally contacting shaft, and an internally contacting cylinder internally contacting with the intermediate shafts, at least one of the intermediate shafts offset from the center being an input shaft, and the externally contacting shaft being a ring-like hollow cylinder.

2. A traction drive type driving apparatus according to claim 1, wherein the externally contacting shaft forming the ring-like hollow cylinder is supported by the intermediate shafts without disposing any particular supporting bearing to form a floating ring, and the hollow externally contacting shaft has an outer diameter under free condition being a little bit larger than the diameter of an imaginary circle which externally contacts with the plurality of intermediate shafts whereby pressing load is created by deformation of the hollow cylinder.

3. A traction drive type driving apparatus according to claim 2, wherein the internally contacting cylinder is an output shaft.

4. A traction drive type driving apparatus according to claims 3 wherein it further comprises a supporting member for rotatably supporting the plurality of intermediate shafts and the internally contacting cylinder, and the supporting member is an output shaft.

5. A traction drive type driving apparatus according to claim 1, wherein the internally contacting cylinder comprises coaxially arranged double hollow rings, the inner ring and the outer ring of the double hollow rings are connected to each other by means of connecting means.

6. A traction drive type driving apparatus according to claim 5, wherein inner ring of the internally contacting cylinder of the ring-like hollow cylinder is supported by the intermediate shafts without disposing any particular supporting bearing to form a floating ring, whereby deformation of the inner ring caused by deformation of the externally contacting shaft formed in the ring-like hollow cylinder is prevented from being transmitted to the outer ring.

7. A traction drive type driving apparatus according to claim 6, wherein the internally contacting cylinder is an output shaft.

8. A traction drive type driving apparatus according to claim 6, wherein it further comprises a supporting member for rotatably supporting the plurality of intermediate shafts and the internally contacting cylinder, and the supporting member is an output shaft.

9. A traction drive type driving apparatus comprising an externally contacting shaft located at the center, a plurality of intermediate shafts equidistantly disposed around and externally contacting with the externally contacting shaft, and an internally contacting cylinder internally contacting with the intermediate shafts, the externally contacting shaft or at least one of the intermediate shafts being an input shaft, the internally contacting cylinder being of deformable hollow ring-like and integrally engaging with a holding member of the internally contacting cylinder by means of a holding means.

10. A traction drive type driving apparatus according to claim 9, wherein the internally contacting cylinder of a ring-like hollow cylinder is supported by the intermediate shafts without disposing any particular supporting bearing to form a floating ring, and the hollow internally contacting cylinder has an inner diameter under free condition being a little bit smaller than the diameter of an imaginary circle which externally contacts with the plurality of intermediate shafts whereby pressing load is created by deformation of the internally contacting cylinder.

11. A traction drive type driving apparatus according to claim 9, wherein the holding member of the internally contacting cylinder is an output shaft.

12. A traction drive type driving apparatus according to claim 9, wherein it further comprises a supporting member for rotatably supporting the plurality of intermediate shafts and the holding member of the internally contacting cylinder, and the supporting member is an output shaft.

\* \* \* \* \*